(12) United States Patent
Dembinski et al.

(10) Patent No.: US 10,579,073 B2
(45) Date of Patent: Mar. 3, 2020

(54) SYSTEMS AND METHODS FOR RIDE CONTROL SYNCHRONIZATION

(71) Applicant: Universal City Studios LLC, Universal City, CA (US)

(72) Inventors: Kyle Andrew Dembinski, Orlando, FL (US); Steven Morris King, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 288 days.

(21) Appl. No.: 15/794,820

(22) Filed: Oct. 26, 2017

(65) Prior Publication Data

US 2018/0120862 A1    May 3, 2018

Related U.S. Application Data

(60) Provisional application No. 62/413,520, filed on Oct. 27, 2016.

(51) Int. Cl.
*G05D 1/02* (2006.01)
*G08G 1/00* (2006.01)

(52) U.S. Cl.
CPC ......... *G05D 1/0293* (2013.01); *G05D 1/0223* (2013.01); *G05D 1/0297* (2013.01); *G08G 1/20* (2013.01)

(58) Field of Classification Search
CPC .. G05D 1/0293; G05D 1/0223; G05D 1/0297; G08G 1/20

(Continued)

(56) References Cited

U.S. PATENT DOCUMENTS 5,803,411 A  *  9/1998  Ackerman ................ B61L 3/00
                                                         246/169 R
6,281,606 B1 *  8/2001  Westlake ............... A63H 19/24
                                                            307/125
(Continued)

FOREIGN PATENT DOCUMENTS

JP          4005541 B2 * 11/2007
JP          4176568 B2 * 11/2008
(Continued)

OTHER PUBLICATIONS

PCT International Search Report and Written Opinion dated Jan. 17, 2018.

*Primary Examiner* — Tuan C To
(74) *Attorney, Agent, or Firm* — Fletcher Yoder P.C.

(57) ABSTRACT

A ride control system includes a central controller configured to synchronize movements of separate groups of ride vehicles along a path. Each of the separate groups of ride vehicles includes multiple individual ride vehicles unconnected to one another and forming a virtual train. Each virtual train is assigned one or more schedules having multiple expected positions along the path and multiple expected timestamps. Each of the expected timestamps of the multiple expected timestamps are associated with respective expected positions of the multiple expected positions. The ride control system also includes multiple vehicle controllers. Each vehicle controller of the multiple vehicle controllers is communicatively coupled to a respective individual ride vehicle of the multiple individual ride vehicles. Each vehicle controller is configured to control a speed of the respective individual ride vehicle along the path based at least on the one or more schedules.

20 Claims, 5 Drawing Sheets

(58) Field of Classification Search
USPC .......................................................... 701/119
See application file for complete search history.

(56) References Cited

U.S. PATENT DOCUMENTS

| | | | | |
|---|---|---|---|---|
| 6,631,322 | B1* | 10/2003 | Arthur | B61L 27/0027 340/991 |
| 7,922,127 | B2* | 4/2011 | Kumar | B61L 27/0027 246/28 R |
| 8,132,513 | B2 | 3/2012 | Crawford et al. | |
| 8,154,227 | B1* | 4/2012 | Young | A63H 19/24 318/255 |
| 8,682,511 | B2 | 3/2014 | Andreasson | |
| 9,014,965 | B2 | 4/2015 | King et al. | |
| 9,457,282 | B2 | 10/2016 | Maycock et al. | |
| 2004/0093196 | A1* | 5/2004 | Hawthorne | B61L 3/125 703/8 |
| 2009/0115638 | A1* | 5/2009 | Shankwitz | G01C 21/26 340/988 |
| 2010/0256835 | A1 | 10/2010 | Mudalige | |
| 2013/0144517 | A1* | 6/2013 | Kickbusch | B61L 27/0077 701/119 |
| 2015/0012157 | A1 | 1/2015 | Nemeth et al. | |
| 2015/0336012 | A1 | 11/2015 | Maycock et al. | |
| 2016/0091593 | A1* | 3/2016 | Millman | G01C 21/20 701/468 |
| 2017/0166221 | A1* | 6/2017 | Osterman | A63G 25/00 |
| 2017/0309171 | A1* | 10/2017 | Zhao | G01S 19/13 |

FOREIGN PATENT DOCUMENTS

JP           2013172604 A  *  9/2013
WO     WO-2015047177 A1  *  4/2015

* cited by examiner

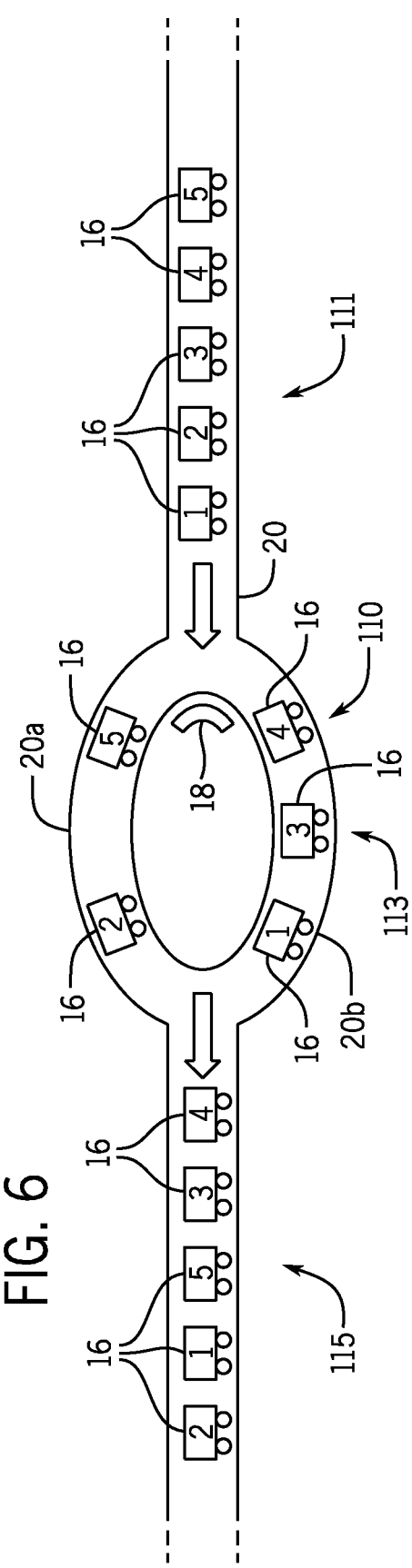
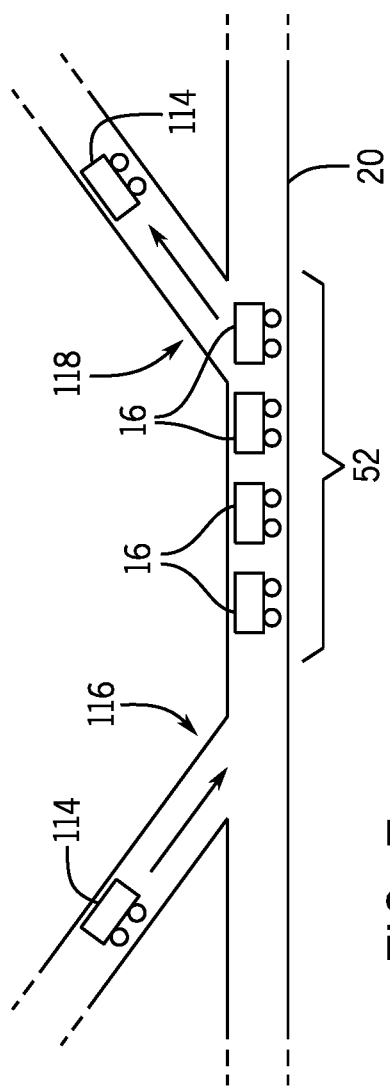

SYSTEMS AND METHODS FOR RIDE CONTROL SYNCHRONIZATION

CROSS-REFERENCE TO RELATED APPLICATION

This application claims priority to and the benefit of U.S. Provisional Application No. 62/413,520 entitled "SYSTEMS AND METHODS FOR A RIDE CONTROL SYSTEM WITH VIRTUAL SYNCHRONIZATION," filed Oct. 27, 2016, which is hereby incorporated by reference in its entirety for all purposes.

FIELD OF DISCLOSURE

The present disclosure relates generally to the field of amusement parks. More specifically, embodiments of the present disclosure relate to methods and equipment used in conjunction with amusement park games or rides.

BACKGROUND

Since the early twentieth century, amusement parks (or theme parks) have substantially grown in popularity. One type of amusement park attraction may consist of multiple ride vehicles, which travel along a track. In certain attractions, each ride vehicle's location and speed may be measured and/or calculated via one or more sensors and/or controllers to determine spacing relative to other ride vehicles to ensure desired distances are maintained between each ride vehicle on the track. Such systems and control schemes may be difficult to implement, inefficient to operate, and costly to maintain.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a ride control system includes a central controller configured to synchronize movements of separate groups of ride vehicles along a path. Each of the separate groups of ride vehicles includes multiple individual ride vehicles unconnected to one another and forming a virtual train. Each virtual train is assigned one or more schedules having multiple expected positions along the path and multiple expected timestamps. Each of the expected timestamps of the multiple expected timestamps are associated with respective expected positions of the multiple expected positions. The ride control system also includes multiple vehicle controllers. Each vehicle controller of the multiple vehicle controllers is communicatively coupled to a respective individual ride vehicle of the multiple individual ride vehicles. Each vehicle controller is configured to control a speed of the respective individual ride vehicle along the path based at least on the one or more schedules.

In another embodiment, a method includes assigning multiple schedules to respective multiple virtual trains. Each schedule of the multiple schedules comprises a set of expected timestamps associated with a respective set of expected positions along a path. The method also includes determining actual positions and associated actual timestamps of vehicles within the multiple virtual trains along the path, and comparing the actual positions and associated actual timestamps to the multiple schedules. The method further includes adjusting a speed and/or a position of individual vehicles within an individual virtual train based on a deviation of the actual positions and associated actual timestamps from the multiple schedules while maintaining distances between the individual vehicles within predetermined ranges.

In another embodiment, a method includes determining a relative position for each ride vehicle within a virtual train having ride vehicles and assigning one or more schedules including a set of expected timestamps and a set of associated expected positions along a path to each ride vehicle of the virtual train based at least on the relative position. The method also includes separating two or more subsets of the ride vehicles of the virtual train along a path based at least on the relative position and the one or more schedules. The method further includes rejoining the two or more subsets of the ride vehicles of the virtual train along the path after the separating such that the relative position of one or more ride vehicles within the virtual train is changed after the separating and rejoining.

DRAWINGS

These and other features, aspects, and advantages of the present disclosure will become better understood when the following detailed description is read with reference to the accompanying drawings in which like characters represent like parts throughout the drawings, wherein:

FIG. 6 is a schematic of a portion of the theme park ride of FIG. 1, in accordance with an embodiment of the present disclosure; and FIG. 7 is a schematic of a portion of the theme park ride of FIG. 1, in accordance with an embodiment of the present disclosure.

DETAILED DESCRIPTION

Figure 1:
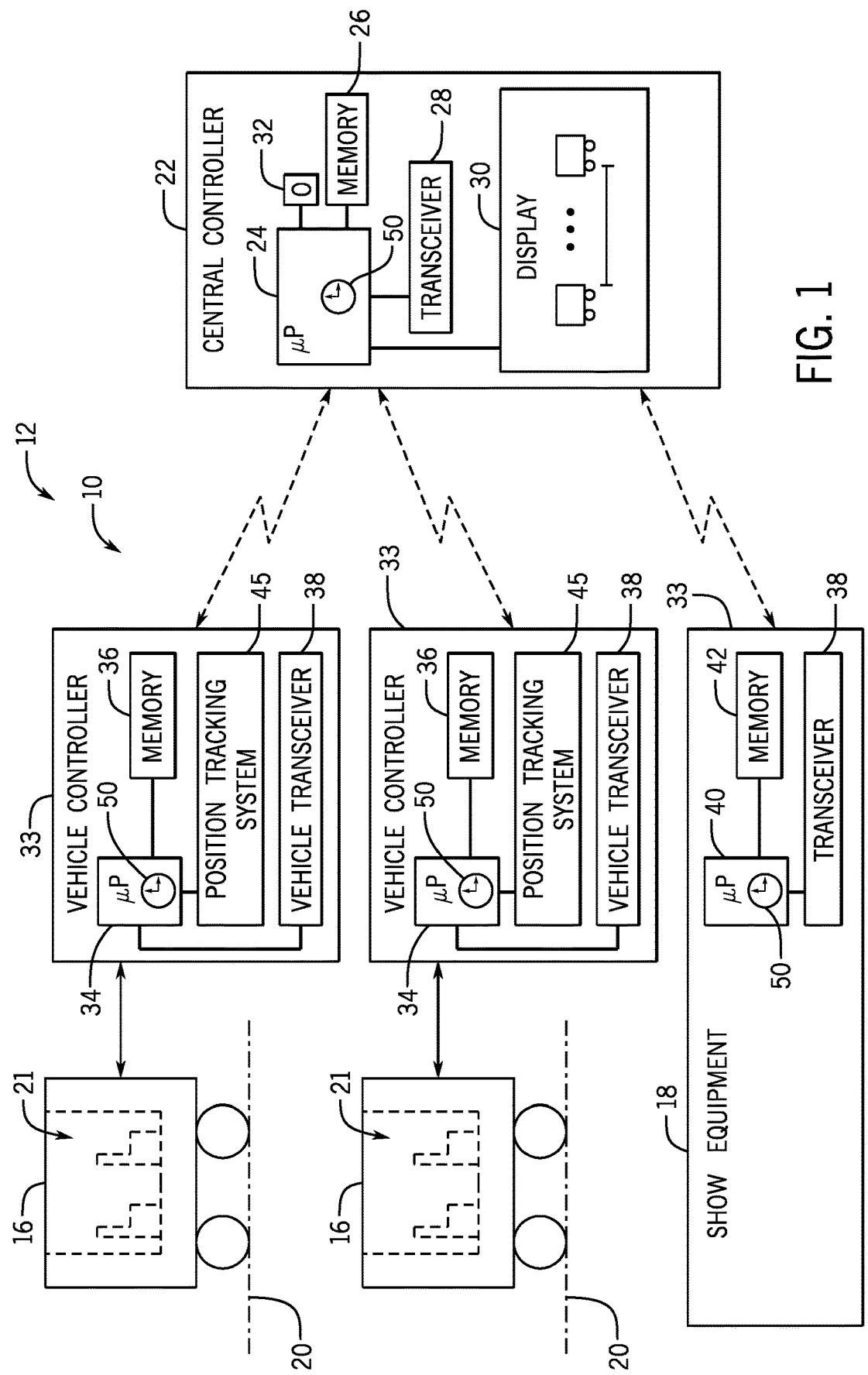
FIG. 1 is a block diagram of an embodiment of ride control system of a theme park ride, in accordance with an embodiment of the present disclosure.

The present disclosure provides a system and method for synchronization of groups of ride vehicles, or "virtual trains", to facilitate coordinated control of a group of physically separate or unconnected ride vehicles ride vehicles of an attraction in an amusement park. Because the vehicles in a virtual train as provided are physically unconnected, the individual vehicles may be capable of experiencing more complex special effects (e.g., pitching or rolling effects) that may be more difficult to execute on a train of physically connected cars. However, the unconnected vehicles may nonetheless be efficiently controlled as a group via a central ride controller. Particularly, the groups of ride vehicles and other attraction features may be synchronized through one or more clocks or controllers. For example, positions of the ride vehicles relative to a path may be associated with timestamps of one or more clocks. The actual positions and the associated actual timestamps (e.g., as measured or determined based on vehicle position information) may be communicated to a master controller to determine if the ride vehicles are located within expected locations along the path at an expected time. Deviations may trigger adjustments to speed in individual vehicles. However, such adjustments are bounded by predetermined desired distance ranges between adjacent vehicles of the virtual train. That is, if an individual vehicle of a virtual train is lagging behind schedule, any increase in speed may be translated to other vehicles of the virtual train to maintain desired spacing between the train vehicles.

Generally, amusement park attractions will include rides or shows that include vehicles that travel along a path (e.g., a railway or a track). For example, traveling rides may be situated in different surroundings (e.g., on a mountain top, in a tunnel, under the water, etc.), and the vehicles may move along the path through different types of show events (e.g., moving action figures (animatronics), video screen projections, sound effects, water effects, etc.). In particular, the movement of a particular vehicle along the path may be synchronized with other vehicles on the path, the surroundings, show equipment along the path (e.g., animatronics, video screen projections, sound effects, water effects, lighting effects, etc.), and/or other attractions within the surroundings.

For some theme rides, the movements of the vehicles may be monitored and controlled by a ride control system having a central controller or computer. The central controller may monitor each vehicle's position and speed along an associated path relative to other vehicles, the surroundings, show equipment, and/or other attractions. For example, the central controller may determine the vehicle spacing between one or more vehicles, and may stop all the vehicles on the track when the vehicle spacing is within a predetermined minimum distance. As a further example, the central controller may determine the vehicle's position along the path prior to triggering certain show equipment. In these and other situations, the central controller may determine the vehicle's position along the track based on sensor feedback received from sensors mounted at various locations along the path. However, such traditional feedback-based control systems may be costly to maintain, difficult to integrate, and may limit the freedom of movement of the vehicles along the path. Further, such traditional feedback-based control systems may not allow for vehicles on the path to be synchronized in an efficient manner.

In certain embodiments, an amusement park ride is provided that may include efficient synchronization of individual ride vehicles, groups of ride vehicles, and/or show equipment. Specifically, the amusement park ride may include one or more ride vehicles, or groups of ride vehicles (e.g., virtual trains), that may be synchronized through a central controller and clock. For example, in some embodiments, each ride vehicle may include an internal clock and one or more position sensors. As the ride vehicle travels along a path, the ride vehicle may determine its position on the path along with a timestamp associated with the position from the internal clock. The determined position and the associated timestamp may then be compared to a schedule, or a set of expected positions and expected timestamps. Based on the comparison, a speed of the ride vehicle may be adjusted. For example, the ride vehicle may increase in speed if the ride vehicle is "behind-schedule" or decrease in speed if the ride vehicle is "ahead-of-schedule".

In some embodiments, a ride vehicle's speed may be directly adjusted through input of a vehicle controller associated with the ride vehicle and/or may be indirectly adjusted through input of a central controller of the amusement park ride. Particularly, the ride vehicles may travel along the path in groups, or "virtual trains". In certain embodiments, each virtual train may receive a schedule or other inputs from the central controller while the individual ride vehicles within the virtual trains may receive inputs from their respective vehicle controllers based on the schedule received by the virtual train. To this end, each ride vehicle may be a "trusted vehicle", or a "smart vehicle", that may maintain its position within the virtual train without direct input from the central controller. That is, the central controller may monitor and control the virtual trains and not necessarily monitor and control each individual ride vehicle on the path. Therefore, the central controller may operate more efficiently while utilizing less computing power. In this manner, each ride vehicle may maintain its own position with a high degree of accuracy within the virtual train, thereby enabling the ride vehicles to travel in close proximity of each other within the virtual trains without a mechanical connection between the ride vehicles of the virtual train.

With the foregoing in mind, FIG. 1 is a schematic of an embodiment of a ride control system 10, which may be utilized in a theme park ride 12 in accordance with embodiments of the present disclosure. The ride control system 10 may include a central controller 22, one or more ride vehicles 16, and various show equipment 18. The ride vehicles 16 may be positioned within a course and configured to travel along a path 20 (e.g., a railway or a track). Indeed, in some embodiments, the path 20 may include a track. Additionally, or in the alternative, the path 20 may be trackless and the ride vehicles 16 may be automated guided vehicles (AGVs) that may travel in a direction as outlined by the path 20 over a variety of terrain included in the path 20. In certain embodiments, the ride vehicle 16 is configured to carry passengers within a passenger seating area 21 while traveling along the path 20. In certain embodiments, the ride vehicle 16 may be a component of a show or attraction, such as a moving action figure (e.g., animatronics) and/or various other moving show equipment. The ride vehicles 16 may move in a particular direction along the path 20, as illustrated in greater detail with respect to FIG. 2. In certain situations, the ride control system 10 may be configured to control the ride vehicles 16 such that they move in coordination with each other and/or in coordination with other show equipment 18. For example, one or more ride vehicles 16 may be traveling along the path 20 simultaneously with one another, and the ride control system 10 may be configured to synchronize the movement of each ride vehicle 16 along the path 20. As a further example, when the ride vehicle 16 moves along the path 20 and approaches show equipment 18 associated with a show event, the ride control system 10 may be configured to synchronize the show event with the movement of the ride vehicle 16. In particular, the ride control system 10 may be configured to synchronize the movement of the ride vehicles 16 along the path 20 through timing schemes, or synchronization, as further described in detail herein.

The ride control system 10 may synchronize operations of the one or more ride vehicles 16 and show equipment 18 along the path 20. To this end, the ride control system 10 may include the central controller 22 having a central processor 24, a central memory 26 for storing instructions executable by the central processor 24, a central transceiver 28 for wirelessly communicating with the ride vehicles 16 and the show equipment 18, and a display 30 for displaying a position of the ride vehicles 16 along the path 20. The central processor 24 may be a way-side processor that includes various components that may allow for operator interaction and control of the ride vehicles 16 and show equipment 18. In other words, the central processor 24 may be in communication with an input device 32 that may receive input from an operator. For example, in some embodiments, an operator may monitor the positions of the ride vehicles 16 on the display 30 and may make one or more adjustments to the positions and/or speeds of the ride vehicles 16 through the input device 32. In certain embodiments, the operator may make adjustments to schedules of the ride vehicles 16, as discussed herein.

Indeed, in certain embodiments, the central controller 22 may be configured to monitor and control the movement of the ride vehicles 16 such that they are virtually synchronized with each other and the show equipment 18. Further, in some embodiments, each ride vehicle 16 may be configured to monitor and control its own movement such that its movement is synchronized with other ride vehicles 16 and/or the shown equipment 18. For example, in some embodiments, the central controller 22 may monitor and control the movement of a virtual train (e.g., group) of ride vehicles 16 along the path 20. In such embodiments, each ride vehicle 16 within the virtual train may monitor and control its own individual movement while the central controller 22 monitors and controls the movement of the virtual train as a whole. In other words, each ride vehicle 16 may be a "trusted vehicle", or a "smart vehicle", which is configured to control its own actions without necessarily receiving direct input from the central controller 22, as discussed in detail below. To this end, each ride vehicle 16 may include a vehicle controller 33, which further includes a vehicle processor 34, a vehicle memory 36 for storing instructions executable by the vehicle processor 34, and a vehicle transceiver 38 for wirelessly communicating with the other ride vehicles 16, the show equipment 18, and the central controller 22. Similarly, in some embodiments, the show equipment 18 may also be configured to function independently of and/or in conjunction with the central controller 22 to coordinate with the ride vehicles 16 and other show equipment 18. To this end, each piece of show equipment 18 may include a show equipment processor 40, a show equipment memory 42 for storing instructions executable by the show equipment processor 40, and a show equipment transceiver 44 for wirelessly communicating with other pieces of show equipment 18, the ride vehicles 16, and the central controller 22.

Further, each vehicle controller 33 may include a position tracking system 45, which is configured to detect a position of the ride vehicle 16 on the path 20. For example, in some embodiments, the position tracking system 45 may include a linear encoder configured to measure/detect a position of the ride vehicle 16 along the path 20 and/or a distance traveled by the vehicle 16 relative to a starting point along the path 20. In some embodiments, the position tracking system 45 may include any other suitable sensor that is configured to detect a position of the ride vehicle 16 in relation to the path 20 such as a rotary encoder, a variable differential transformer, a hall-effect sensor, capacitive sensor, or any combination thereof.

The ride vehicles 16 may be virtually synchronized with each other and the show equipment 18 through one or more clocks 50 (e.g., chronographs, chronometers, etc.). For example, in some embodiments, each of the ride vehicles 16 and the show equipment 18 may synchronize to a clock 50 of the central controller 22. In some embodiments, groups of one or more ride vehicles 16 and/or groups of the show equipment 18 may each synchronize to respective clocks 50. Still further, in some embodiments, each ride vehicle 16 and show equipment 18 may synchronize to respective individual clocks 50. As discussed throughout, synchronization of one or more ride vehicles 16 and/or show equipment 18 to one or more clocks 50 may include tracking and coordinating a time and distance of travel of the ride vehicles 16 along the path 20 relative to one or more schedules, and coordinating show events of the show equipment 18 relative to the one or more schedules.

Figure 2:
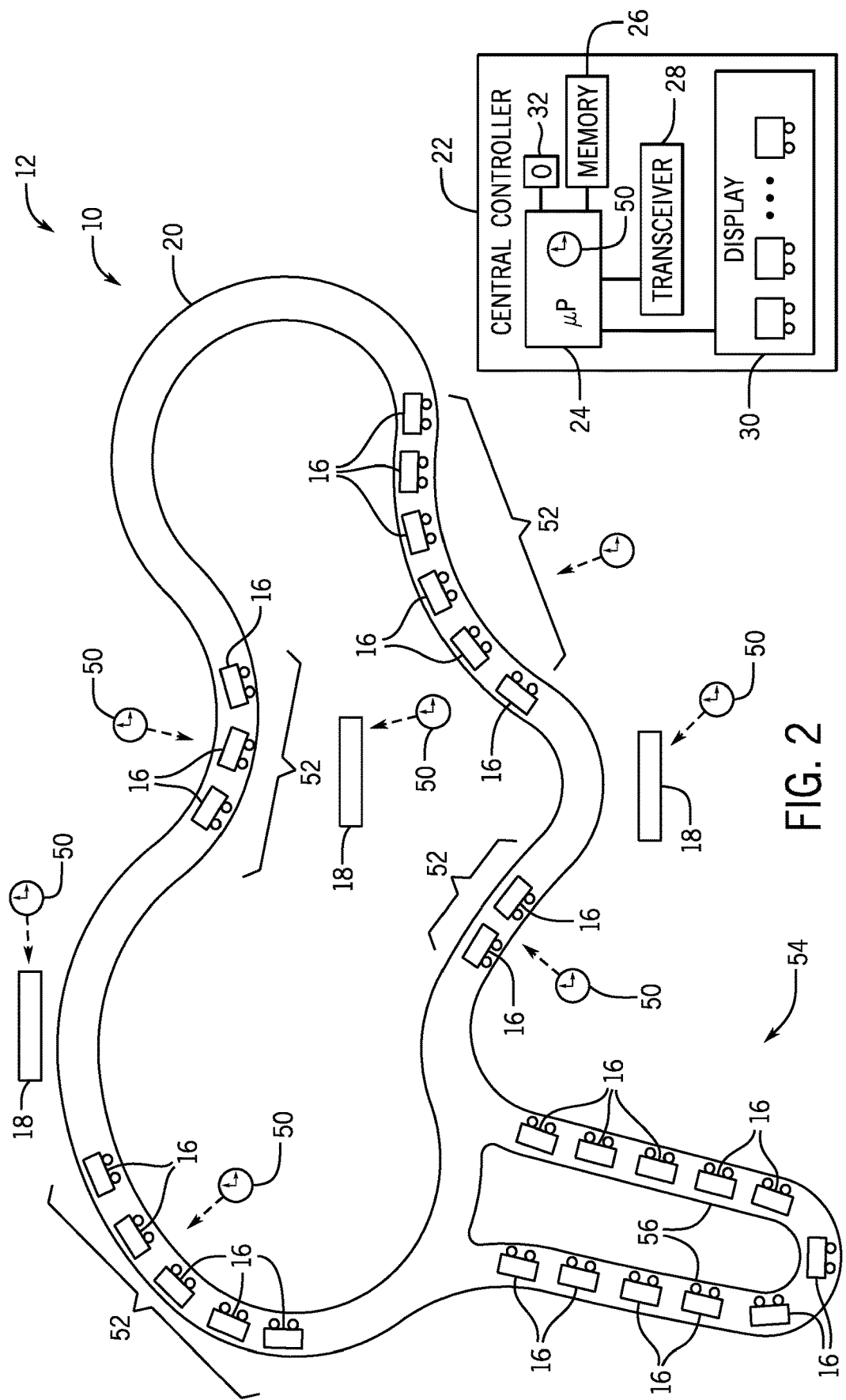
FIG. 2 is a schematic of the theme park ride of FIG. 1, in accordance with an embodiment of the present disclosure.

By way of example, FIG. 2 is a plan view of an embodiment of the path 20 upon which the ride vehicles 16 travel, where the ride vehicles 16 are controlled by the ride control system 10 of FIG. 1 to be in synchronization with one another, in accordance with embodiments of the present disclosure. Particularly, the ride vehicles 16 and the show equipment 18 may be virtually synchronized through one or more of the clocks 50 as they travel along the path 20. For example, in some embodiments, multiple ride vehicles 16 may travel along the path 20 together in a virtual train 52, which may be enabled at least in part due to synchronization of the ride vehicles 16 through one or more of the clocks 50. Indeed, the ride vehicles 16 of the virtual train 52 may be virtually synchronized such that virtual train 52 travels along the path 20 in a manner similar to a train with mechanically coupled train cars.

A virtual train 52 may be, as provided herein, a group of ride vehicles 16 that may travel along the path 20 within close proximity of one another while being physically uncoupled. A theme park ride 12 may be implemented with one or more virtual trains 52, each having a plurality of ride vehicles 16. Each virtual train 52 may be separately controlled, such that a control signal for a specific virtual train 52 controls only the group of vehicles 16 that are part of the targeted virtual train 52 and does not control the ride vehicles 16 of the theme park ride 12 that are associated with other virtual trains 52.

In some embodiments, each ride vehicle 16 of a virtual train 52 may be spaced apart from adjacent ride vehicles 16 of the virtual train 52 such that the time that elapses between each ride vehicle 16 crossing over a particular point on the path 20 is substantially the same between each ride vehicle 16 of the virtual train 52. Indeed, in some embodiments, the elapsed time between each ride vehicle 16 of a virtual train 52 passing a fixed point may remain substantially similar while a distance between each ride vehicle 16 of a virtual train 52 may vary depending on one or more factors of the path 20. Such factors may include increases or decreases in elevation of the path 20, turns in the path 20, intentional increases and/or decreases of speed of the virtual train 52, other factors of the path 20 that may induce changes in direction of momentum, speed, and/or acceleration of the ride vehicles 16, and so forth.

Each virtual train 52 may include any suitable number of ride vehicles 16. For example, in some embodiments, each virtual train 52 may vary in length and in number of ride vehicles 16, which may be due at least partially to a number of passengers attempting to utilize the theme park ride 12 at a certain time. Particularly, passengers may load and unload from the ride vehicles 16 while the ride vehicles 16 are in a loading area 54. As depicted, in some embodiments, the loading area 54 may be reached from an auxiliary path 56.

In some embodiments, the loading area 54 may be disposed within a section of the path 20. Indeed, as provided herein, each virtual train 52 may be dynamically reconfigured at each run of the ride to have a suitable number of ride vehicles 16, depending on the desired ride throughput.

As discussed herein, the central controller 22 may monitor and/or control the virtual trains 52 present on the path 20 while the ride vehicles 16 may be controlled without direct input from the central controller 22. To this end, the central controller 22 may determine the positions of each of the virtual trains 52 in a number of ways. For example, the ride vehicles 16 of a particular virtual train 52 may measure/detect their positions on the path 20 via their respective position tracking systems 45 (FIG. 1). Then, in an embodiment, the ride vehicles 16 may send their measured/detected positions to a vehicle controller 33 of a designated "lead" ride vehicle 16 of the particular virtual train 52, which may compile the measured/detected positions of the ride vehicles 16 to determine the length of the virtual train 52, the relative position of each ride vehicle 16 within the virtual train 52, and the position of the virtual train 52 on the path 20. Indeed, in certain embodiments, the central controller 22 may communicate with each virtual train 52 through the vehicle controller 33 of the designated "lead" ride vehicle 16. Additionally, or in the alternative, in some embodiments, the ride vehicles 16 may send their measured/detected positions to the central controller 22, which may then compile the measured/detected positions to determine the length of the virtual train 52, the relative position of each ride vehicle 16 within the virtual train 52, and the position of the virtual train 52 on the path 20. In such embodiments, the central controller 22 may communicate with the particular virtual train 52 by sending a general signal to the virtual train 52 that may be received by the vehicle controllers 33 of each of the ride vehicles 16 within the virtual train 52. That is, the control signal may be a single control signal (e.g., a drive signal) for the entire virtual train 52 rather than customized or individual control signals for each individual ride vehicle 16. In this manner, the central controller 22 may not monitor each ride vehicle 16 individually and may simply monitor the virtual train 52 as whole, thereby saving in power consumption and computing power. Further, by providing a single control signal to a virtual train 52, communication may be streamlined.

As provided herein, each ride vehicle 16 may be a "trusted vehicle" configured to adjust its own speed appropriately relative to a schedule and/or to other ride vehicles 16. For example, prior to the ride vehicles 16 leaving from the loading area 54, the central controller 22 may assign a schedule to each virtual train 52. A schedule may be, in one embodiment, defined as a set of expected locations on the path 20 for the ride vehicles 16 of the virtual train 52, each associated with an expected timestamp. The schedule may be associated with each virtual train 52 and/or individual ride vehicles 16 of the virtual train 52. For example, after receiving a control signal to follow the schedule, the virtual train 52 may reference one or more clocks 50 to determine if one or more ride vehicles 16 of the virtual train 52 are "on-schedule". Particularly, after the ride vehicle 16 and/or the virtual train 52 has been assigned a schedule and a clock 50, the ride vehicle 16 may then travel along the path 20 such that the ride vehicle 16 is positioned at locations along the path 20 at times that substantially match the expected locations and the expected timestamps of the schedule.

Additionally, or in the alternative, the central controller 22 may assign a schedule to the virtual train 52 as a set of time and/or distance threshold ranges between ride vehicles 16 of a virtual train 52 and/or between virtual trains 52. For example, the central controller 22 may determine time differences between adjacent virtual trains 52 and may adjust speeds of the virtual trains 52 accordingly. To illustrate, a first virtual train 52 may arrive at a particular position along the path 20 at a first time. A second virtual train 52 may then arrive at the particular position along the path 20 at a second time. If the difference between the first time and the second time is outside of a predetermined range (e.g., a predetermined minimum and maximum time difference) of the schedule, the first virtual train 52, the second virtual train 52, or both may adjust their speed such that the time difference between the first virtual train 52 and the second virtual train 52 is within the predetermined threshold range. Additionally, or in the alternative, the first virtual train 52 and/or the second virtual train 52 may determine a position difference between the first virtual train 52 and the second virtual train 52, which in some embodiments, may be based at least in part on the time differences between the first virtual train 52 and the second virtual train 52, and may adjust accordingly as described above.

The virtual trains 52 may receive a schedule (e.g., a control signal or set of instructions associated with the schedule) when departing from the loading area 54. In some embodiments, a location/time-based schedule may be dynamically updated based on a time and/or distance threshold range-based schedule. For example, as discussed above, if a virtual train 52 is outside of the predetermined range of the schedule, the ride vehicle 16 and/or the virtual train 52 may adjust its speed to be within the predetermined range. At the same time, the ride vehicle 16 and/or the virtual train 52 may also adjust its schedule to account for the change in speed.

Further, while the virtual trains 52 are operated according to a schedule, the show equipment 18 may also receive a show schedule associated with the schedules of each of the virtual trains 52 present on the path 20. For example, the show equipment 18 may be configured to perform a certain action at a certain time. Indeed, the show equipment 18 may be configured to perform a certain action according to the show schedule such that the certain action is performed by the show equipment 18 while a particular virtual train 52 is located in an appropriate position along the path 20. In other words, the show equipment 18 may be configured to perform a certain action while users within the ride vehicles 16 of the particular virtual train 52 have a perspective of the show equipment 18. Indeed, in some embodiments, the show schedule of the show equipment 18 may change in coordination with the standard schedule and the relative schedule discussed above.

To implement the schedules, the ride control system 10 may utilize one or more clocks 50. For example, as mentioned above, in some embodiments, each of the ride vehicles 16, the show equipment 18, and the central controller 22 may all be individually associated with (e.g., in communication with) separate clocks 50. Additionally, or in the alternative, the central controller 22 may include multiple clocks 50 and may assign clocks 50 to different tasks within the theme park ride 12. For example, a clock 50 of the central controller 22 may be associated with a virtual train 52, one or more show equipment 18, one or more virtual trains 52, one or more schedules of the virtual trains 52 and/or the show equipment 18, or any combination thereof in order to implement the schedules discussed above. To illustrate, each of the schedules discussed above include certain expected positions/actions associated with expected timestamps. The ride vehicles 16, the virtual trains 52, and/or the show equipment 18 may reference its assigned clock 50 to ensure that it is in the correct position and/or is performing the correct action at the appropriate time, according to the schedules.

Figure 3:
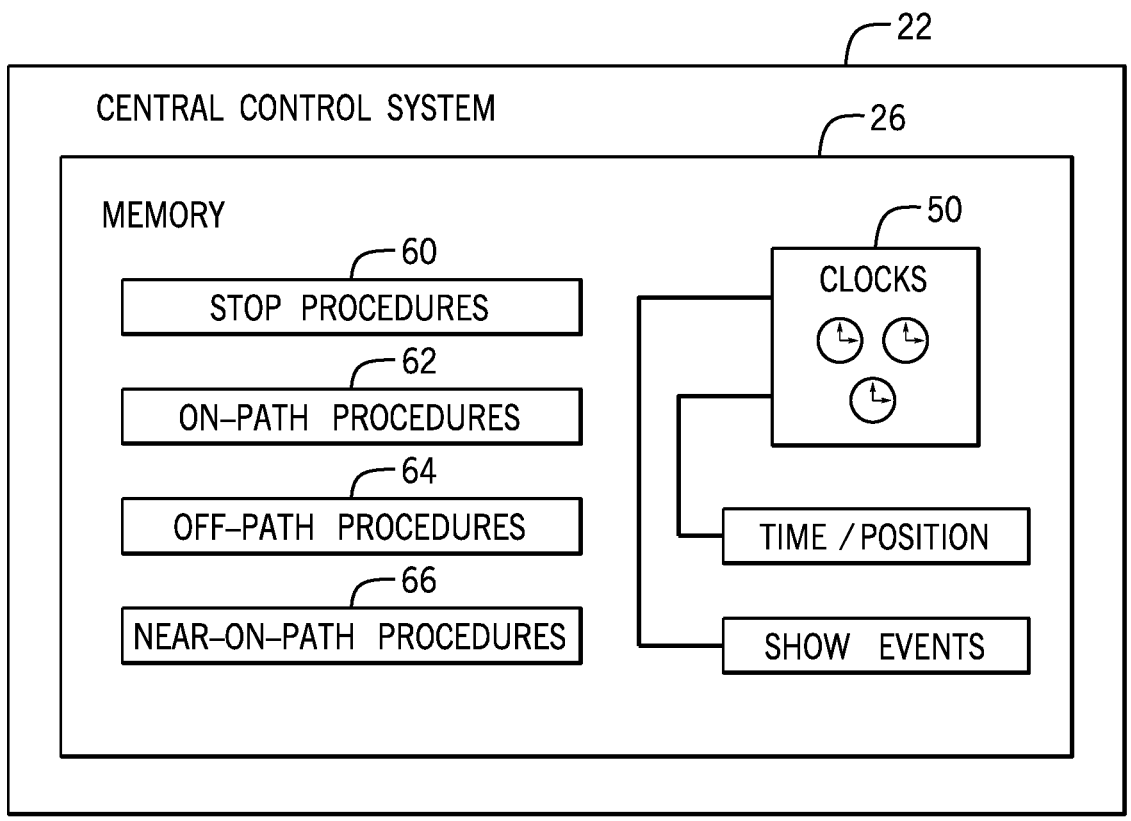
FIG. 3 is a block diagram of a portion of the ride control system of FIG. 1, in accordance with an embodiment of the present disclosure.

In some embodiments, the central controller 22 may be configured to implement one or more procedures to keep the virtual trains 52 on schedule. To illustrate, FIG. 3 is a schematic representation of an embodiment of procedures implemented by the ride control system 10 of FIG. 1, in accordance with embodiments of the present disclosure. As noted above, the central controller 22 may include the central memory 26 configured to store instructions or procedures that may be implemented by the central controller 22. For example, in certain embodiments, the central memory 26 may hold procedures that may be implemented by the central controller 22 to monitor and control any of the ride vehicles 16, the virtual trains 52, or the show equipment 18 of the theme park ride 12 to be in synchronization with each other.

For example, in certain embodiments, the central memory 26 may include "STOP" procedures 60, "ON-PATH" procedures 62, "OFF-PATH" procedures 64, and "NEAR-ON-PATH" procedures 66, and so forth. Further, the central memory 26 may include various other information, such as one or more clocks 50, the position that any particular ride vehicle 16, piece of show equipment 18, or virtual train 52 must be located at a particular time (e.g., schedules), show events, and so forth.

In certain embodiments, the "STOP" procedures 60 may be an operational feature that is implemented when the position of one of the ride vehicles 16 and/or one of the virtual trains 52, which may be transmitted by the ride vehicle 16 or the virtual train 52 to the central controller 22 for confirmation, does not match the desired or expected position of the ride vehicle 16 or the virtual train 52 for the particular time indicated by one or more of the clocks 50. In other words, the "STOP" procedures 60 may be implemented when one of the ride vehicles 16 and/or one of the virtual trains 52 are not located at an expected location along the path 20 at the appropriate time, or are "off-schedule" by a predetermined amount, as outlined by one or more schedules.

When the "STOP" procedures 60 are engaged or triggered, the central controller 22 may be configured to stop the operation and movement of each of the ride vehicles 16 and/or the virtual trains 52 along the path 20. Indeed, when the "STOP" procedures 60 are engaged or triggered and the operations of the theme park ride 12 are momentarily paused, the schedules may also be adjusted to account for the pause. Further, in certain embodiments, subsequent to the "STOP" procedures 60, the central controller 22 may be configured to implement various other procedures, such as the "ON-PATH" procedures 62, "OFF-PATH" procedures 64, and/or the "NEAR-ON-PATH" procedures 66. The "ON-PATH" procedures 62 may be implemented by the central controller 22 when one or more of the ride vehicles 16 or virtual train 52 are positioned where they are expected to be, and normal operation of the theme park ride 12 may continue. The "NEAR-ON-PATH" procedures 66 may be implemented when one or more of the ride vehicles 16 or virtual trains 52 are slightly off track with regard to their expected position for a particular time, or when one or more of the ride vehicles 16 or virtual trains 52 are off-schedule by a predetermined amount. In these situations, the central controller 22 may implement a recovery sequence, and may send one or more command signals (e.g., corrective moves) to reposition the off-schedule ride vehicle 16 and/or virtual train 52 to the desired or expected location. In certain situations, the central controller 22 may gradually move the off-schedule virtual trains 52 to the desired position and/or may restart the off-schedule virtual trains 52 to recover at a slow pace. The "OFF-PATH" procedures 64 may be implemented when the virtual trains 52 are off-schedule with respect to their expected position for a particular time. In these situations, the central controller 22 may implement a recovery sequence that instructs the virtual trains 52 point-to-point, such that they are positioned in the desired or expected position for the particular time before restarting the ride control system 10. In some embodiments, the "OFF-PATH" procedures 64 may be implementing by sending a correction schedule to the off-schedule ride vehicle 16 and/or virtual train 52.

Figure 4:
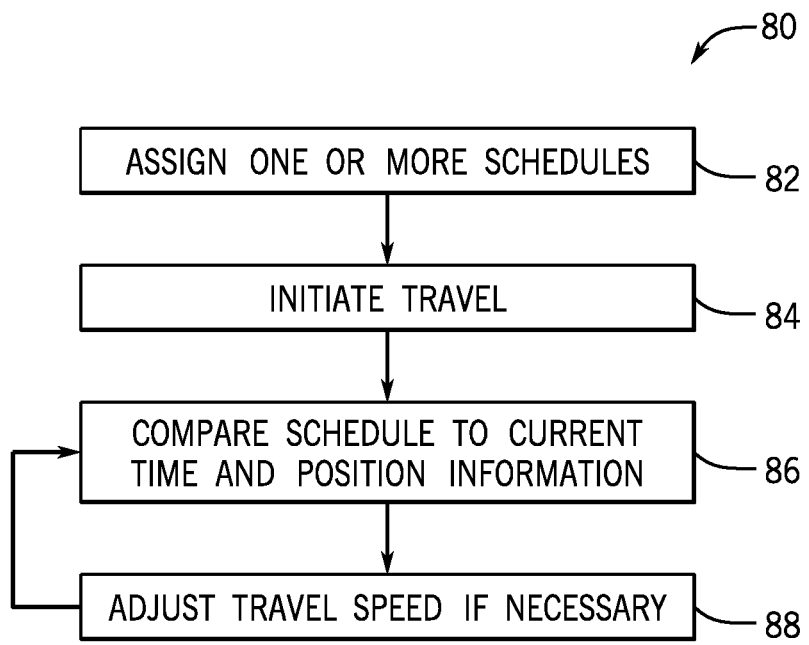
FIG. 4 is a flow chart of a travel process that may be carried out by the ride control system of FIG. 1, in accordance with an embodiment of the present disclosure.

Further, in some embodiments, one or more of the ride vehicles 16 and/or virtual trains 52 may correct their position/speed if they are off-schedule while other virtual trains 52 on the path 20 continue to travel along the path, as described above in the description of FIG. 3. For example, FIG. 4 is a flow chart describing a travel process 80 that one or more of the ride vehicles 16 and/or the virtual trains 52 may implement as it travels along the path 20.

At block 82, a vehicle (e.g., one of the ride vehicles 16 and/or one of the virtual trains 52) may receive one or more schedules. As discussed above, a schedule may indicate a positions that a vehicle should be relative to the path 20 at certain times and/or may indicate how a distance/time threshold that the vehicle should be relative to other vehicles along the path 20. Once the vehicle has received the one or more schedules, the vehicle may initiate travel (block 84) along the path 20. As the vehicle travels along the path 20, the vehicle may monitor its position on the path 20 relative to a time, which may be tracked by one or more clocks 50. The one or more clocks 50 may be included within the vehicle and/or may be separate from the vehicle, such as within a different vehicle and/or within the central controller 22. As the vehicle monitors its position and time, the vehicle may compare its monitored position to expected positions and times of one or more schedules (block 86).

If the vehicle determines that its current position and time does not substantially match the expected positions and timestamps of the one or more schedules, the vehicle may be instructed to increase or decrease its speed appropriately (block 88). For example, if the vehicle reaches a certain position along the path 20 prior to the expected time of the schedule, the vehicle may momentarily increase its speed until the measured positions and times substantially match the expected positions and timestamps of the schedule. Similarly, if the vehicle reaches a certain position along the path 20 subsequently of the expected timestamp of the schedule, the vehicle may momentarily decrease its speed until the measured positions and associated times substantially match the expected positions and timestamps of the schedule.

In this manner, each vehicle, and more specifically, each ride vehicle 16 and/or virtual train 52 may be trusted (e.g., "smart"). That is, each ride vehicle 16 may be enabled to monitor and correct its speed/position along the path 20 independently. The vehicle may continue the travel process 80 until the vehicle has traveled the length of the path 20 and/or until the vehicle reaches the loading area 54 (FIG. 2).

Figure 5:
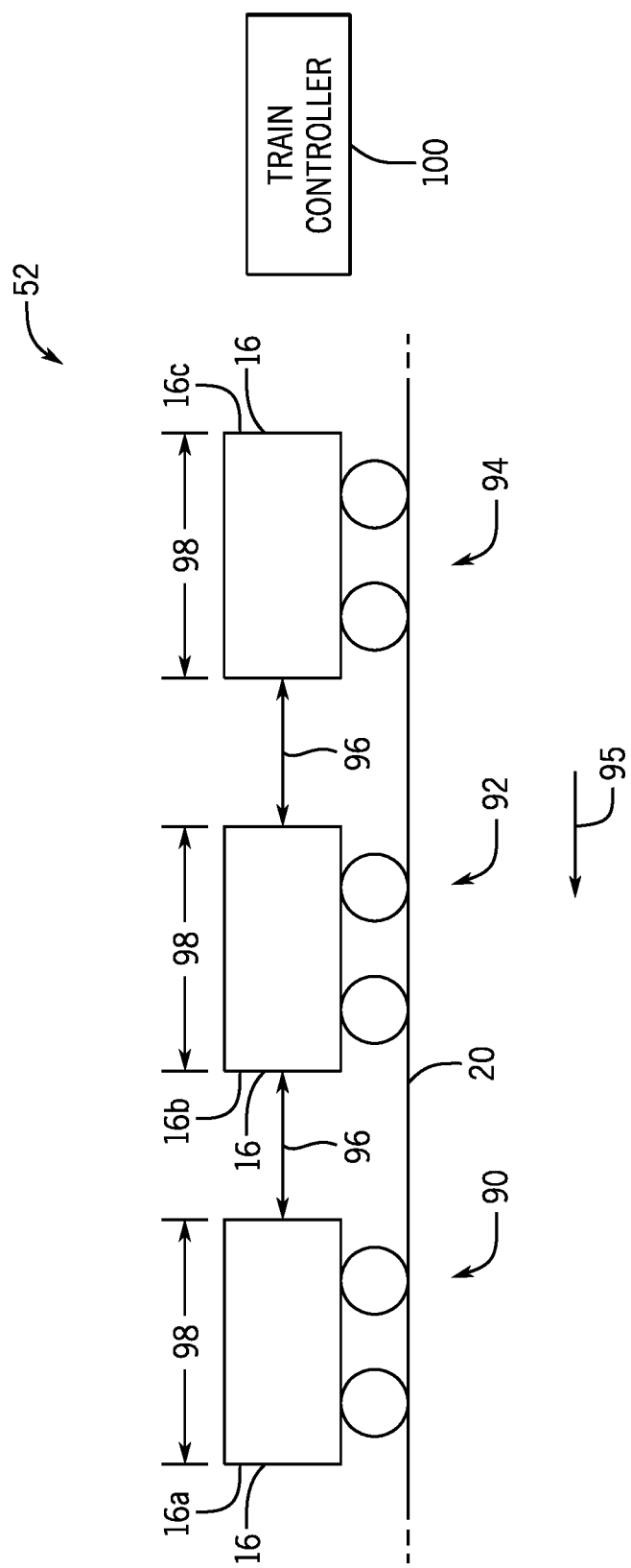
FIG. 5 is a block diagram of a group of ride vehicles of the theme park of FIG. 1, in accordance with an embodiment of the present disclosure.

In some embodiments, the relative position of the ride vehicles 16 within the virtual trains 52 may also be monitored and controlled. For example, FIG. 5 is schematic of ride vehicles 16 within a virtual train 52. In some embodiments, the central controller 22 may assign certain ride vehicles 16 to form a virtual train 52, and may monitor the ride vehicles 16 through the virtual train 52, as discussed above. That is, when in the loading area 54 (FIG. 2), the central controller 22 may assign schedules to the ride vehicles 16 such that the ride vehicles 16 travel within a certain virtual train 52. In this manner, the central controller 22 may track the relative position of the ride vehicles 16 within the virtual train 52. In some embodiments, the ride vehicles 16 may communicate their position on the path 20 to the central controller 22 so that the central controller 22 may determine the relative position of the ride vehicles 16 within the virtual train 52 before the central controller 22 sends the schedules to the virtual trains 52.

In the illustrated embodiment, the virtual train 52 contains three separate ride vehicles 16, which are denoted by a ride vehicle 16a, a ride vehicle 16b, and a ride vehicle 16c. As shown, the ride vehicle 16c, the ride vehicle 16b, and the ride vehicle 16c may each be in a first position 90, a second position 92, and a third position 94, respectively, relative to a direction of travel 96 of the virtual train 52 along the path 20.

In some embodiments, a train controller 100 may monitor and control the relative position of the ride vehicles 16 within the virtual train 52. Specifically, in some embodiments, the train controller 100 may be the central controller 22 and/or the vehicle controller 33 of the "lead" ride vehicle 16 within the virtual train 52. For example, in certain embodiments, before starting along the path 20 from the loading area 54, each ride vehicle 16 of the virtual train 52 may communicate its current position in the loading area 54 to the train controller 100. The train controller 100 may then determine the relative position (e.g., first, second, or third position 90, 92, 94) of each ride vehicle 16 within the virtual train 52. After the train controller 100 has determined the relative position of the ride vehicles 16 within the virtual train 52, the train controller 100 may assign schedules as described above to the individual ride vehicles 16 based at least on their relative position. Indeed, in some embodiments, some ride vehicles 16 may have different experiences along the path 20 according to their relative position. For example, the ride vehicles 16 may experience different special effects or travel along different portions of the path 20 based at least on their relative position within the virtual train 52.

Further, as discussed above, the ride vehicles 16 may be "trusted" vehicles that are configured to maintain distances relative to other ride vehicles 16 within the virtual train 52, which in some embodiments, may have an effect similar to a traditional mechanical connection of train cars of a locomotive. For example, each ride vehicle 16 may be separated by a separation distance 96, which in some embodiments, may also correspond to a time difference between the ride vehicles 16 as they travel along the path 20. Particularly, in certain embodiments, the separation distance 96 may be maintained at a length that substantially matches a ride vehicle length 98 of the ride vehicles 16. Further, in certain embodiments, the separation distance 96 may be maintained at any other suitable distance that may be less than the ride vehicle length 98 and/or greater than the ride vehicle length 98. Indeed, the separation distance 96 may be substantially less than a distance between other virtual trains 52 along the path 20. That is, ride vehicles 16 within a virtual train 52 may be closer to one another than to other ride vehicles 16 associated with adjacent or other virtual trains 52. Overall, the separation distance 96 may be maintained by the ride vehicles 16 acting on the positions and timestamps of the other ride vehicles 16 within the virtual train 52, with reference to one or more clocks 50 to track the time/timestamps.

In some embodiments, the ride vehicles 16 within the virtual train 52 may have different experiences on the path 20, which, in certain embodiments, may depend on the position of the ride vehicles 16 (e.g., first, second, or third 90, 92, 94). For example, only one or a subset of the ride vehicles 16 may experience certain special effects. In some embodiments, the special effects may be administered from a special effects system included in the ride vehicles 16 and/or included in a location adjacent to the path 20. Special effects may include, for example, vibration effects, sound effects, water effects, scent effects, bass effects, smoke/vapor effects, and so forth. As discussed herein, because the individual ride vehicles 16 are physically separate or uncoupled, the motion effects may be triggered on a per-vehicle basis. In another example, in contrast to trains or longer coupled vehicles that may experience irregularity in globally-applied motion effects (e.g., more intense effects at the ends relative to the middle of the train), the virtual trains 52 may be capable of providing more uniform experiences, if desired, during motion effects.

Indeed, in some embodiments, each ride vehicle 16 within the virtual train 52 may travel along the path 20 in a different manner relative to other ride vehicles 16 within the virtual train 52. For example, in some embodiments, one of the ride vehicles 16 may switch positions within the virtual train 52. To illustrate, in certain embodiments, the ride vehicle 16a may move from the first position 90 to the third position 94 while the ride vehicle 16b moves to the first position 90 and the ride vehicle 16c moves to the second position 92. In this manner, passengers within the virtual train 52 may experience being in the lead vehicle position at different points within the theme park ride 12, which may increase enjoyment and thrills.

FIG. 6 represent possible embodiments of the path 20 that enable switching of relative positions of the ride vehicles 16 within the virtual train 52. In some embodiments, as shown in FIG. 6, the path 20 may include a split-path portion 110, which may include two separate paths 20 (e.g., a path 20a and a path 20b). In some embodiments, the split-path portion 110 may include any suitable number of separate paths 20. Further, in some embodiments, the split-path portion 110 may include one or more loops that function similarly to the separate paths 20. Particularly, the split-path portion 110 may provide for switching (e.g., shuffling) of an order of the ride vehicles 16 within a virtual train 52. For example, each ride vehicle 16 of the virtual train 52 may travel together (e.g., during a first instance 111) along the path 20 until the virtual train 52 reaches the split-path portion 110. Once the virtual train 52 reaches the split-path portion 110, one or more of the ride vehicles 16 may travel along the path 20a while the other ride vehicles 16 travel along the path 20b (e.g., during a second instance 113). Indeed, any suitable number or subset of the ride vehicles 16 may travel along either the path 20a or the path 20b. While traversing the split-path portion 110, the ride vehicles 16 may increase and/or decrease speed appropriately such that the ride vehicles 16 may converge in a different order after having traversed the split-path portion 110 (e.g., during a third instance 115). For example, as shown, the virtual train 52 may include five ride vehicles 16, each donated by a number one through five, respectively. Before reaching the split-path portion 110, the ride vehicles 16 may travel along the path 20 sequentially as shown. After traveling through the split-path portion 110, the ride vehicles 16 may converge or rejoin the ride vehicles 16 in a different order than before the split-path portion 110, as shown. In certain embodiments, show equipment 18 may be disposed at the start of the split-path portion 110 and may perform show events according to a schedule such that the show events are performed as the virtual train 52 reaches the split-path portion 110.

FIG. 7 is a schematic of a portion of the path 20 in accordance with an embodiment. Particularly, in some embodiments, one or more of the ride vehicles 16 may be show vehicles 114 that include show equipment 18 or actors disposed within the show vehicle 114. In such embodiments, the show vehicles 114 may converge with a virtual train 52 while the virtual train 52 travels along the path 20. For example, in some embodiments, a virtual train 52 may travel along the path 20 while it approaches a show entry 116 where one or more show vehicles 114 may converge with the virtual train 52. Particularly, the ride vehicles 16 within the virtual train 52 may form one or more extended gaps between adjacent ride vehicles 16 as the virtual train 52 approaches the show entry 116. The virtual train 52 may then travel past the show entry 116 after the extended gaps have formed within the virtual train 52. While the virtual train 52 travels past the show entry 116, the show vehicle(s) 114 may be inserted into the extended gaps within the virtual train 52. After traveling with the ride vehicles 16 for a portion of the path 20, the show vehicles 114 may exit the virtual train 52 through a show exit 118. After the show vehicle 114 exits the virtual train 52, the extended gaps left by the show vehicles 114 may close as the ride vehicles 16 within the virtual train 52 once again converge to be disposed within suitable distances and/or within suitable time differences of each other.

While only certain features of present embodiments have been illustrated and described herein, many modifications and changes will occur to those skilled in the art. It is, therefore, to be understood that the appended claims are intended to cover all such modifications and changes that fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A ride control system, comprising:
a central controller configured to synchronize movements of separate groups of ride vehicles along a path, wherein each of the separate groups of ride vehicles comprises a plurality of individual ride vehicles unconnected to one another and forming a virtual train, wherein each virtual train is assigned one or more schedules comprising a plurality of expected positions along the path and a plurality of expected timestamps, and wherein each of the expected timestamps of the plurality of expected timestamps are associated with respective expected positions of the plurality of expected positions; and
a plurality of vehicle controllers, wherein each vehicle controller of the plurality of vehicle controllers is communicatively coupled to a respective individual ride vehicle of the plurality of individual ride vehicles, wherein each vehicle controller is configured to control a speed of the respective individual ride vehicle along the path based at least on the one or more schedules.

2. The ride control system of claim 1, wherein the vehicle controllers are configured to determine positions of the respective individual ride vehicles via a position tracking system, and wherein the vehicle controllers are configured to communicate the positions of the respective individual ride vehicles to the central controller.

3. The ride control system of claim 2, wherein the position tracking system comprises one or more linear encoders.

4. The ride control system of claim 2, wherein the central controller comprises one or more clocks configured to determine timestamps associated with the separate groups of ride vehicles, and wherein the central controller is configured to adjust the one or more schedules based at least on the timestamps and the positions of the respective individual ride vehicles.

5. The ride control system of claim 1, comprising show equipment, wherein the show equipment comprises one or more clocks, and wherein the show equipment is configured to perform show events based at least on the one or more schedules and timestamps from the one or more clocks.

6. The ride control system of claim 1, wherein each of the vehicle controllers comprises a clock configured to determine timestamps for the respective individual ride vehicles, wherein each of the vehicle controllers comprise a position tracking system configured to track positions of the respective individual ride vehicles, and wherein the vehicle controller is configured to adjust the speed of the respective individual ride vehicles based at least on the timestamps and positions of the respective individual ride vehicles.

7. The ride control system of claim 1, wherein the plurality of vehicle controllers are configured to adjust the speed or position of the respective individual ride vehicles to maintain a predetermined elapsed time difference between the respective individual ride vehicles of the separate groups of ride vehicles relative to one or more positions along the path.

8. The ride control system of claim 1, wherein the central controller comprises a display configured to display positions of the separate groups of ride vehicles, and wherein the central controller comprises an input device configured to receive input from an operator to adjust a position and/or a speed of the separate groups of ride vehicles.

9. The ride control system of claim 1, wherein relative positions of the plurality of individual ride vehicles within the groups of vehicles are configured to be changed via a split-path portion of the path according to the one or more schedules.

10. A method, comprising:
assigning a plurality of schedules to a respective plurality of virtual trains, wherein each schedule of the plurality of schedules comprises a set of expected timestamps associated with a respective set of expected positions along a path;
determining actual positions and associated actual timestamps of vehicles within the plurality of virtual trains along the path;
comparing the actual positions and associated actual timestamps to the plurality of schedules; and
adjusting a speed and/or a position of individual vehicles within an individual virtual train based on a deviation of the actual positions and associated actual timestamps from the plurality of schedules while maintaining distances between the individual vehicles within predetermined ranges.

11. The method of claim 10, comprising:
assigning a global schedule to the plurality of virtual trains, the global schedule comprising a train timestamp difference relative to a location along the path between adjacent virtual trains of the plurality of virtual trains.

12. The method of claim 11, wherein the train timestamp difference between the adjacent virtual trains is greater than vehicle timestamp differences of adjacent individual vehicles of the individual virtual train.

13. The method of claim 10, comprising:
assigning one or more schedules of the plurality of schedules to show equipment, wherein the show equipment is configured to perform a show event according to an expected show timestamp of the one or more schedules.

14. The method of claim 10, comprising:
determining relative positions of the individual vehicles within individual virtual train based at least on the actual positions and associated timestamps.

15. The method of claim 10, comprising:
wherein the vehicles of the plurality of virtual trains are not physically connected to one another.

16. The method of claim 10, wherein the plurality of virtual trains have different numbers of ride vehicles, and wherein the set of expected timestamps and the set of associated positions of the schedules takes into account the different numbers of ride vehicles.

17. The method of claim 10, comprising:
inserting one or more show vehicles into the individual virtual train as the individual virtual train travels along the path.

18. A method comprising:
determining a relative position for each ride vehicle within a virtual train comprising ride vehicles;
assigning one or more schedules comprising a set of expected timestamps and a set of associated expected positions along a path to each ride vehicle of the virtual train based at least on the relative position;
separating two or more subsets of the ride vehicles of the virtual train along a path based at least on the relative position and the one or more schedules; and
rejoining the two or more subsets of the ride vehicles of the virtual train along the path after the separating such that the relative position of one or more ride vehicles within the virtual train is changed after the separating and rejoining.

19. The method of claim 18, wherein separating the two or more subsets of the ride vehicles comprises:
sending a first subset along a first path of a split-path portion of the path based at least on the one or more schedules; and
sending a second subset along a second path of the split-path portion of the path based at least on the one or more schedules.

20. The method of claim 19, wherein separating the two or more subsets further comprises:
adjusting distances between the ride vehicles of the first subset and/or the second subset.

* * * * *